United States Patent
Bharitkar et al.

(10) Patent No.: US 10,659,877 B2
(45) Date of Patent: May 19, 2020

(54) COMBINED AUDIO SIGNAL OUTPUT

(71) Applicant: Hewlett-Packard Development Company, L.P., Spring, TX (US)

(72) Inventors: Sunil Bharitkar, Palo Alto, CA (US); Madhu Sudan Athreya, Palo Alto, CA (US); David Murphy, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/473,345

(22) PCT Filed: Mar. 8, 2017

(86) PCT No.: PCT/US2017/021370
§ 371 (c)(1),
(2) Date: Jun. 25, 2019

(87) PCT Pub. No.: WO2018/164681
PCT Pub. Date: Sep. 13, 2018

(65) Prior Publication Data
US 2019/0387313 A1  Dec. 19, 2019

(51) Int. Cl.
*H04R 3/00* (2006.01)
*G10L 25/24* (2013.01)
(Continued)

(52) U.S. Cl.
CPC .............. *H04R 3/005* (2013.01); *G10L 25/24* (2013.01); *H04R 1/406* (2013.01); *H04L 65/403* (2013.01)

(58) Field of Classification Search
CPC .... H04R 3/005; H04R 1/406; H04R 2420/07; G10L 25/24; H04N 21/8456;
(Continued)

(56) References Cited

U.S. PATENT DOCUMENTS 6,219,645 B1   4/2001  Byers
8,144,182 B2   3/2012  Shoemake et al.
(Continued)

FOREIGN PATENT DOCUMENTS

CN   105206281        12/2015
WO   WO-2012174902 A1  12/2012
WO   WO-2017005978 A1  1/2017

OTHER PUBLICATIONS

Igel, B et al., Distributed Audio Network for Speech Enhancement in Challenging Noise Backgrounds, Jan. 13, 2012, < http://www.fh-dortmund.de/de/ftransfer/medien/fob11/Igel_a.pdf >.
(Continued)

*Primary Examiner* — Lun-See Lao
(74) *Attorney, Agent, or Firm* — Mannava & Kang

(57) ABSTRACT

According to examples, an apparatus may include a processor and a memory on which is stored machine readable instructions that are to cause the processor to determine a reference frame from a plurality of frames received at multiple different times, in which each of the plurality of frames includes audio signal data, and in which the reference frame includes audio signal data that identifies a highest audio signal level among audio signals identified in the plurality of frames. The reference frame may be time-aligned with each of the plurality of frames other than the reference frame to obtain respective time-aligned frames. The audio signals identified in each of the respective time-aligned frames may be added together to generate respective added audio signals. The respective added audio signals may be combined together to obtain a combined audio signal and the combined audio signal may be outputted.

15 Claims, 7 Drawing Sheets

(51) Int. Cl.
*H04R 1/40* (2006.01)
*H04L 29/06* (2006.01)

(58) Field of Classification Search
CPC .......... H04N 21/4302; H04N 21/4307; H04N 21/8106; H04N 5/232; H04N 5/23238; H04N 5/2357; H04N 5/247; H04N 5/262; H04N 5/2627; H04N 5/268; H04N 5/272; H04N 5/278; H04N 5/332; H04L 65/403; H04M 3/56; H04S 2400/15
USPC .......... 381/92, 56–58; 700/94; 704/500–504, 704/206
See application file for complete search history.

(56) References Cited

U.S. PATENT DOCUMENTS

| | | | |
|---|---|---|---|
| 8,214,221 B2* | 7/2012 | Pang | G10L 19/008 |
| | | | 704/500 |
| 8,606,249 B1 | 12/2013 | Goodwin | |
| 9,548,048 B1* | 1/2017 | Solh | G10L 15/24 |
| 2006/0062404 A1* | 3/2006 | Bharitkar | H04S 7/307 |
| | | | 381/99 |
| 2006/0147063 A1 | 7/2006 | Chen | |
| 2007/0078650 A1* | 4/2007 | Rogers | G10L 21/04 |
| | | | 704/229 |
| 2009/0034750 A1* | 2/2009 | Ayoub | G10L 25/69 |
| | | | 381/77 |
| 2010/0183280 A1 | 7/2010 | Beauregard et al. | |
| 2016/0171989 A1 | 6/2016 | Gupta et al. | |
| 2019/0080704 A1* | 3/2019 | Chebiyyam | G10L 19/008 |

OTHER PUBLICATIONS

Matheja, T. et al, a Multi-channel Quality Assessment Setup Applied to a Distributed Microphone Speech Enhancement System with Spectral Boosting, 2012, < http://ieeexplore.ieee.org/stamp/stamp.jsp?arnumber=6309593 >.

* cited by examiner

COMBINED AUDIO SIGNAL OUTPUT

BACKGROUND

Internet protocol (IP) based voice conferencing is growing in popularity and use. IP-based voice conferencing includes the capture at a source location of audio signals, processing of the audio signals to generate data packets, and communication of the data packets over a network to a destination location. The received data packets may be processed into audio signals and the audio signals may be outputted through a speaker at the destination location. The quality of the outputted audio signals is typically affected by the signal to noise ratio (SNR) achieved during capture of the audio signals at the source location.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are apparatuses and methods for enhancing a quality of captured audio signals. Particularly, the apparatuses may receive a plurality of frames from devices at multiple different times. The frames may each include audio signal data corresponding to audio by an audio source and captured by the devices. A reference frame may be determined from the received frames, in which the reference frame includes audio signal data that identifies a highest audio signal level among the audio signals identified in the frames. The reference frame may be time-aligned with each of the other frames to obtain respective time-aligned frames and the audio signals identified in the respective time-aligned frames may be added together to generate respective added audio signals. In addition, the added audio signals may be combined together to obtain a combined audio signal and the combined audio signal may be outputted.

According to examples, the apparatuses and methods disclosed herein may be implemented in an audio conferencing application to enhance a quality of audio signals communicated from an audio source such as a speaker, to a remotely located device. As such, for instance, the apparatuses and methods disclosed herein may improve clarity, speech coding, packet-loss, and signal to noise ratio of the communicated audio signals.

Through implementation of the apparatuses and methods disclosed herein, audio from an audio source may be captured through use of user devices such as laptop computers, smartphones, tablet computers, etc., that include microphones. Thus, for instance, the devices that users may bring to conference rooms may be employed to capture the audio instead of relying on a dedicated microphone-array. In one regard, the costs associated with enhancing the audio signals through implementation of the apparatuses and methods disclosed herein may be lower than the costs associated with implementing a dedicated microphone array that may enhance the audio signals through beamforming to capture audio from a specific direction while minimizing interference.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1:
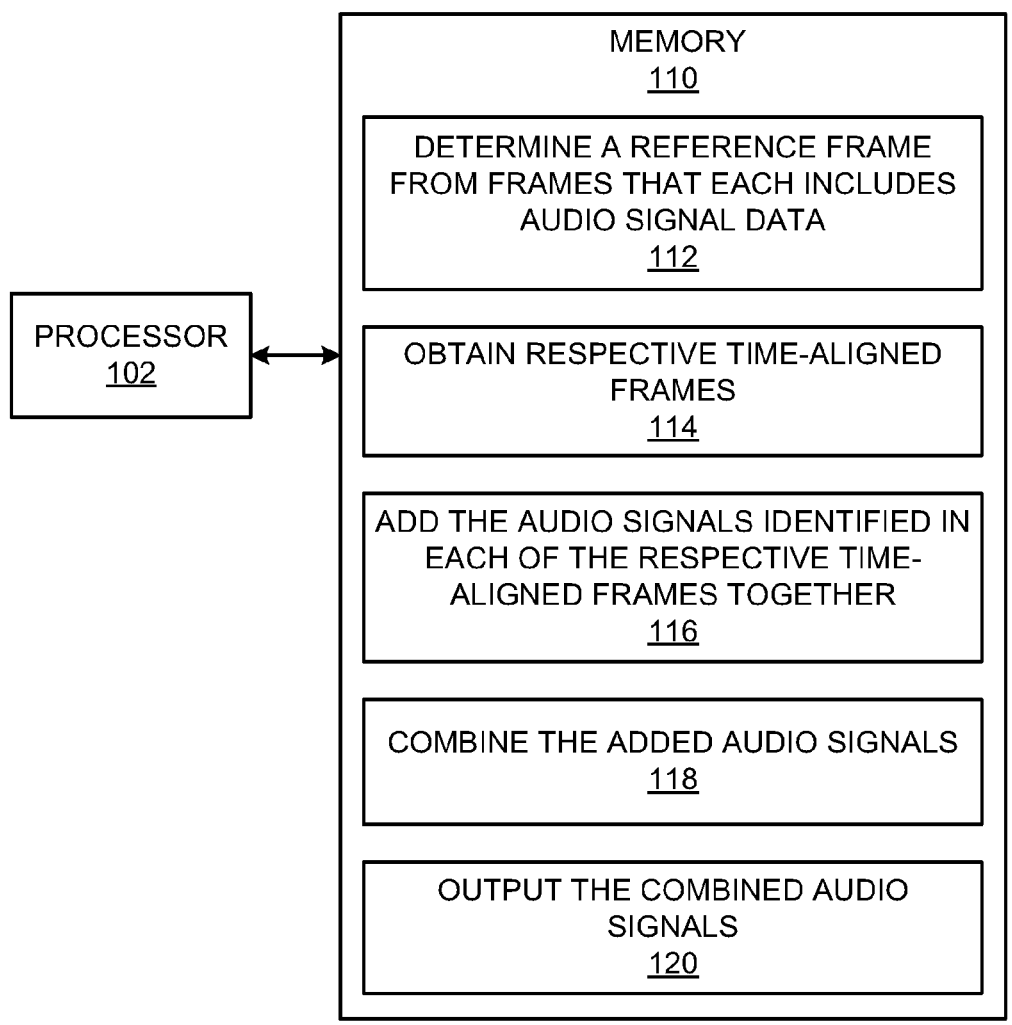
FIG. 1 shows a block diagram of an example apparatus that may be implemented to enhance a quality of captured audio signals.

With reference first to FIG. 1, there is shown a block diagram of an example apparatus 100 that may be implemented to enhance a quality of captured audio signals. It should be understood that the apparatus 100 depicted in FIG. 1 may include additional components and that some of the components described herein may be removed and/or modified without departing from a scope of the apparatus 100 disclosed herein.

The apparatus 100 may be a personal computer, a laptop computer, a tablet computer, a server computer, or the like. In any regard, the apparatus 100 may include a processor 102 and a memory 110 on which is stored machine readable instructions 112-120 that the processor 102 may fetch, decode, and execute. The processor 102 may be a semiconductor-based microprocessor, a central processing unit (CPU), an application specific integrated circuit (ASIC), a field-programmable gate array (FPGA), and/or other hardware device. The memory 110 may be an electronic, magnetic, optical, or other physical storage device that contains or stores executable instructions. The memory 110 may be, for example, Random Access Memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to determine a reference frame from a plurality of frames, in which each of the frames includes audio signal data and the reference frame includes audio signal data that identifies a highest audio signal level among audio signals identified in the plurality of frames. As discussed in greater detail herein, the plurality of frames may correspond to different times with respect to each other. That is, the apparatus 100 may receive the frames from different devices at different times with respect to each other, e.g., depending upon the times at which the devices capture the audio signals from which the frames were received.

The processor 102 may fetch, decode, and execute the instructions 114 to obtain respective time-aligned frames. That is, the processor 102 may execute the instructions 114 to time-align the reference frame with each of the plurality of frames other than the reference frame to obtain the respective time-aligned frames. By way of particular example in which there are four frames, the processor 102 may obtain three time-aligned frames. The processor 102 may fetch, decode, and execute the instructions 116 to add the audio signals identified in each of the respective time-aligned frames together to generate respective added audio signals. The processor 102 may also fetch, decode, and execute the instructions 118 to combine the respective added audio signals together to obtain a combined audio signal. In addition, the processor 102 may fetch, decode, and execute the instructions 120 to output the combined audio signals.

Figure 2:
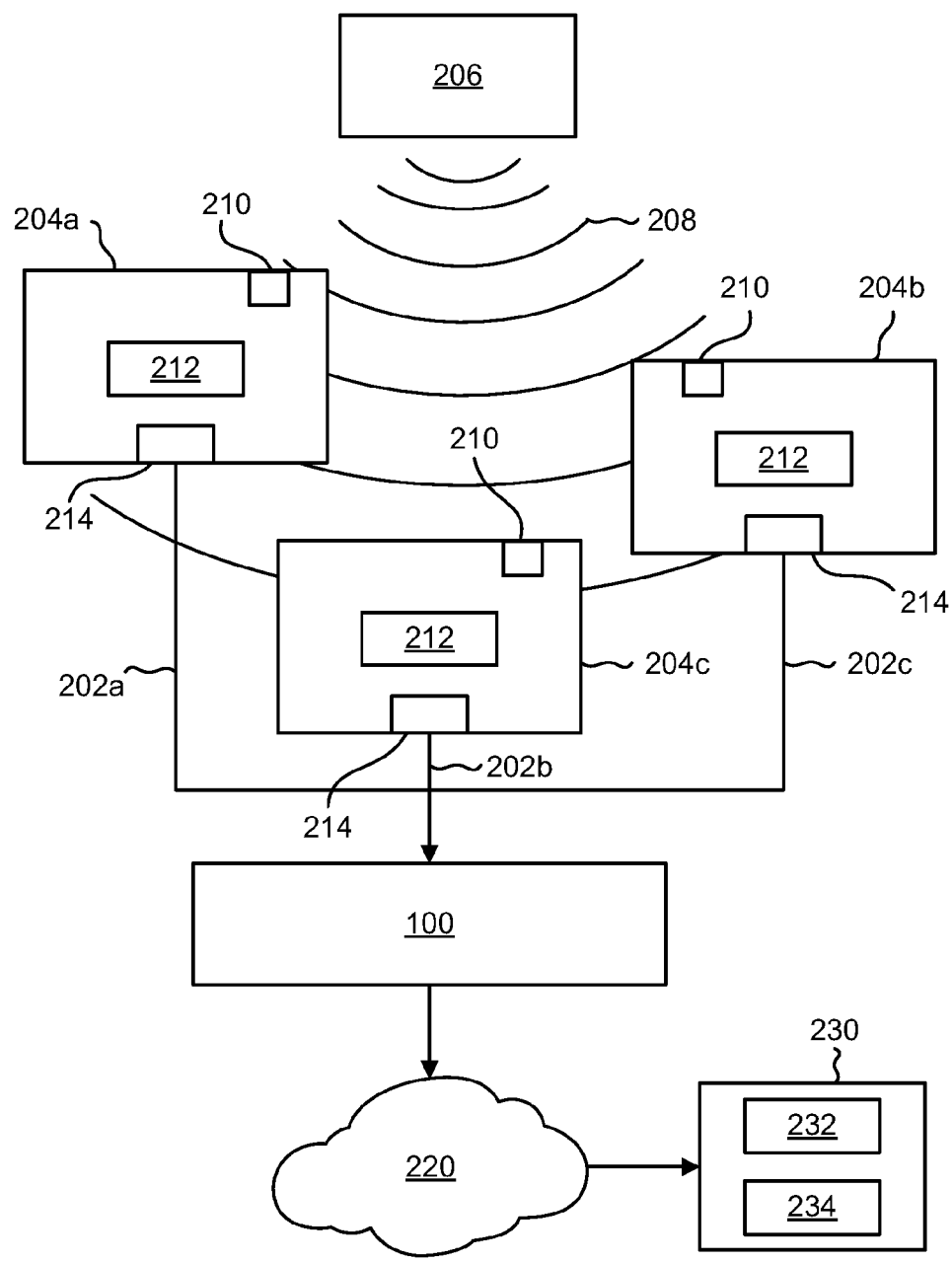
FIG. 2 shows a block diagram of an example environment in which the example apparatus depicted in FIG. 1 may be implemented.

According to examples, and as shown in FIG. 2, the apparatus 100 may receive the frames 202a-202c from a plurality of devices, e.g., distributed devices 204a-204c. The frames 202a-202c may also be referenced as audio signal elements, audio signal items, or the like. FIG. 2 depicts a block diagram of an example environment 200 in which the example apparatus 100 depicted in FIG. 1 may be implemented to enhance a quality of audio signals captured by the devices 204a-204c. As shown in FIG. 2, the devices 204a-204c may be positioned at different distances with respect to an audio source 206. In this regard, audio or sound outputted by the audio source 206 as represented by reference numeral 208 may reach each of the devices 204a-204c at different times with respect to each other. The audio 208 at the devices 204a-204c may also be at different loudness levels with respect to each other because the loudness may decrease as the distance between the audio source 206 and the devices 204a-204c increases.

Each of the devices 204a-204c may include a microphone 210, a processor 212, and a network adapter 214. In other examples, a device 204a may include multiple microphones 210. In any regard, the microphones 210 may capture the audio 208 outputted from the audio source 206 and may convert the captured audio 208 into audio signal data. As the devices 204a-204c and thus, the microphones 210, may be located at different distances from the audio source 206, the generated audio signal data may differ among the devices 204a-204c. For instance, the audio signal data for the device 204a closest to the audio source 206 may indicate a louder sound, a higher signal-to-noise ratio, etc., than the device 204c that is farthest from the audio source 206. In any regard, each of the processors 212 may employ a signal processing technique on the audio signal data converted by a respective microphone 210 to generate frames 202a-202c that include packets (e.g., Ethernet packets) corresponding to or including the audio signal data.

In addition, the devices 204a-204c may transmit the frames 202a-202c to the apparatus 100 via their respective network adapters 214. The network adapters 214 may transmit the frames 202a-202c through any suitable wired or wireless transmission medium. In examples in which the apparatus 100 is located near the devices 204a-204c, the network adapters 214 may transmit the frames 202a-202c via a wifi connection, a Bluetooth™ connection, a local area network, or the like, with the apparatus 100. In other examples, the apparatus 100 may be remotely located from the devices 204a-204c. In these examples, the devices 204a-204c may transmit the frames 202a-202c via an access point or router over a network to the apparatus 100.

By way of particular example, the audio source 206 may be a speaker, e.g., a presenter, a participant, or the like, in a conference room and the devices 204a-204c may be electronic devices in the conference room. Thus, for instance, the audio 208 may be speech. In addition, or in other examples, the devices 204a-204c may be laptop computers, smartphones, speaker phones, tablet computers, personal computers, standalone microphones, or the like. In a particular example, the devices 204a-204c are laptop computers and/or smartphones of participants in the conference room. As such, the apparatus 100 may receive the frames 202a-202c containing the captured audio signals without requiring that a distributed set of dedicated microphone devices be implemented in the conference room. Additionally, it should be understood that three devices 204a-204c have been depicted and described for purposes of simplicity and that any reasonable number of devices may be employed in the environment 200 depicted in FIG. 2.

In any regard, the processor 102 of the apparatus 100 may fetch, decode, and execute the instructions 112-120 as discussed herein on the received frames 202a-202c to combine the audio signals contained in the frames 202a-202c and to output the combined audio signals. In some examples, the processor 102 may output the combined audio signals to a data storage location. In addition or in other examples, the processor 102 may output the combined audio signals over a network 220 to a destination device 230. The network 220 may be the Internet, a local area network, or the like. In any regard, the apparatus 100 may generate data packets containing the combined audio signals and may output the combined audio signals over the network 220 via the generated data packets. In addition, the destination device 230 may include a processor 232 to access the combined audio signals contained in the received data packets and a speaker 234 to play the combined audio signals. Thus, for instance, audio 208 generated remotely from the destination device 230 may be replayed by the destination device 230.

According to examples, the playback of the audio at the destination device 230 may be enhanced through implementation of the audio enhancement techniques implemented by the apparatus 100 as discussed herein. That is, the played audio may have a higher quality, e.g., signal-to-noise ratio, as compared with audio that is captured by a single device and communicated to the destination device 230.

Figure 3:
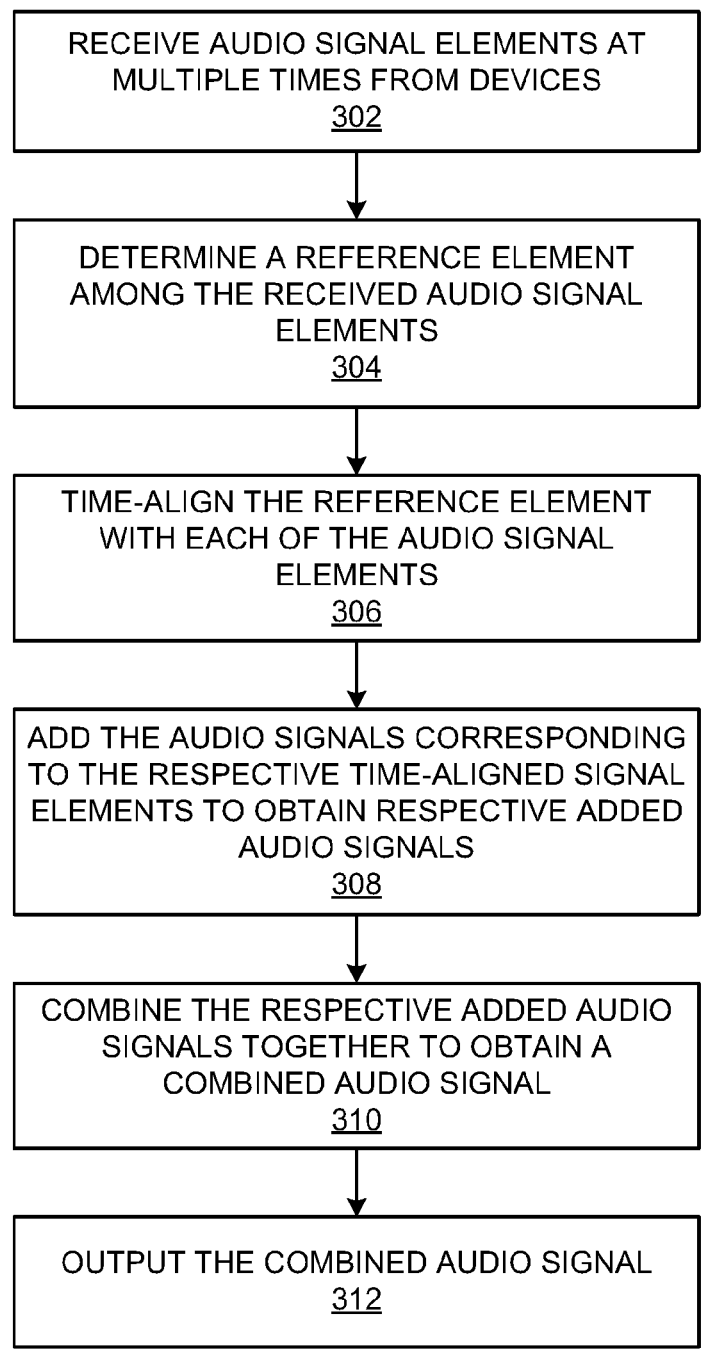
FIG. 3 shows a flow diagram of an example method for enhancing a quality of captured audio signals.

Various manners in which the apparatus 100 may be implemented are discussed in greater detail with respect to the method 300 depicted in FIG. 3. Particularly, FIG. 3 depicts a flow diagram of an example method 300 for enhancing a quality of captured audio signals. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may receive audio signal elements (e.g., frames 202a-202c, audio signal items, etc.) at multiple times from distributed devices 204a-204c. The audio signal elements 202a-202c may correspond to respective audio signals collected by the distributed devices 204a-204c. That is, each of the distributed devices 204a-204c may implement a signal processing technique on the audio signals generated by a respective microphone 210 from audio 208 collected from an audio source 206. The distributed devices 204a-204c may also include the audio signals in respective audio signal elements 202a-202c and may communicate the audio signal elements 202a-202c to the apparatus 100. As each of the distributed devices 204a-204c may be located at different distances from the audio source 206, audio 208 outputted from the audio source 206 may reach the distributed devices 204a-204c at different times with respect to each other. In this regard, the timing at which each of the distributed devices 204a-204c communicates a respective audio signal element 202a-202c to the apparatus 100 corresponding to a particular audio 208 segment may differ from each other.

At block 304, the processor 102 may execute the instructions 112 to determine a reference element among the received audio signal elements 202a-202c. Generally speaking, the reference element may be the audio signal element 202a-202c that corresponds to the audio signal having a highest level among the respective audio signals in the audio signal elements 202a-202c. In this regard, the processor 102 may compare the audio signals contained in the audio signal elements 202a-202c received at block 302 to identify which of the audio signals has the highest level, e.g., loudness, decibel level, etc. The processor 102 may determine the audio signal element 202a corresponding to the audio signal having the highest level as the reference element 202a (which is also referred to herein as the reference frame or certain item).

At block 306, the processor 102 may execute the instructions 114 to obtain respective time-aligned audio signal elements. Particularly, the processor 102 may time-align the reference element 202a with each of the other audio signal elements 202b, 202c. That is, the processor 102 may determine differences in time between when the processor 102 received the reference element 202a and each of the remaining audio signal elements 202b, 202c. For instance, the processor 102 may have received the reference element 202a from a first device 204a at a time t0, the audio signal element 202b from a second device 204b at a time t1, and the audio signal element 202c from a third device 204c at a time t2. The difference in time between when the reference element 202a was received and when the audio signal element 202b from the second device 204b was received may be equal to t1−t0 and the difference in time between when the reference element 202a was received and when the audio signal element 202c from the third device 204c was received may be equal to t2−t0.

The processor 102 may time-align the reference element 202a with the audio signal element 202b by applying the difference in time (t140) to the reference signal element 202a to delay the reference signal element 202a. Similarly, the processor 102 may time-align the reference element 202a with the audio signal element 202c by applying the difference in time (t2−t0) to the reference signal element 202a to delay the reference signal element 202a. In other words, the processor 102 may time-align the reference element 202a with the remaining audio signal elements 202b, 202c such that the audio signals included in the audio signal elements 202a-202c correspond to the same audio 208 and thus overlap with each other. In any regard, at block 306, respective time-aligned audio signal elements may be obtained, e.g., a second audio signal element 202b time-aligned with the reference element 202a, a third audio signal element 202c time-aligned with the reference element 202a, etc.

According to examples, the processor 102 may identify the audio signal elements 202b-202c to be time-aligned with the reference element 202a through implementation of a jitter identification technique. That is, for instance, the processor 102 may implement a jitter identification technique to determine which of a number of audio signal elements that the processor 102 has received correspond in time with the reference element 202a. Descriptions of suitable jitter identification techniques are presented herein below.

At block 308, the processor 102 may execute the instructions 116 to add the audio signals corresponding to the respective time-aligned audio signal elements to obtain added audio signals. That is, the audio signal contained in the delayed and time-aligned reference element 202a may be added to the audio signal contained in the second audio signal element 202b to obtain a first added audio signal. Likewise, the audio signal contained in the reference element 202a may be delayed and added to the audio signal contained in the third audio signal element 202c to obtain a second added audio signal. According to examples, gain may be applied to the audio signals to amplify or enhance the gain of the audio signals prior to the audio signals being added.

At block 310, the processor 102 may execute the instructions 118 to combine the respective added audio signals together to obtain a combined audio signal. As the combined audio signal may include the audio signals of audio collected by multiple microphones, the combined audio signal may have a higher level and a higher quality than the individual audio signals. The combined audio signal may thus have a higher signal-to-noise ratio than the individual audio signals.

At block 312, the processor 102 may execute the instructions 120 to output the combined audio signal. For instance, the processor 102 may output the combined audio signal over a network, such as the Internet. By way of example, the processor 102 may output the combined audio signal through an Internet based voice communication service.

The method 300 may be repeated on an on-going basis as additional audio signal elements are received from the audio source 206 or from other audio sources. In this regard, the reference element may change as the audio source 206 moves and/or as the audio source 206 changes.

The latencies/delays of the devices 204a-204c may be determined a priori if the latencies for audio capture between the devices 204a-204c differ from each other. The devices 204a-204c may be used to capture audio 208 from an audio source 206, e.g., a speaker in a conference room, and the level and quality of the captured audio 208 may be enhanced prior to the captured audio 208 being transmitted, e.g., from the conference room. The processor 102 may perform this by, for instance, estimating an audio source delay ($d_i$) for the i-th distributed microphone according to the following equation.

$$y_i(n) = \alpha_i x_i(n-d_i) (i=1,2,\ldots,N). \quad \text{Equation (1)}$$

In Equation (1), N represents the number of distributed microphones, e.g., the microphones 210 on the devices 204a-204c. In addition, $y_i$ is the output associated with input $x_i$ to the i-th microphone, $\alpha_i$ is a scale factor to control level of input (I) signal, $d_i$ is delay, and n is the time-sample. Speech signals may be captured using a microphone, converted from analog to digital using ND conversion and discretized into samples. N is the n-time sample of speech signal x, in which x is the linear amplitude.

The analysis to reliably estimate the delay parameter ($d_i$) may be broken into two-steps depending on the jitter in the audio signal elements 202a-202c (e.g., packet frames) received at the apparatus 100. In the case of frame-jitter, an additional operation as disclosed herein may be employed involving linear-predictive-coding (LPC) and/or Mel-frequency cepstral coefficients. Particularly, the processor 102 may perform a level analysis, e.g., the processor 102 may perform a mean-square analysis performed on a frame (k), using the following equation:

$$e_{i,dB}(k) = 10 \log_{10}\left(\frac{1}{M}\sum_{n=1}^{M} y_i^2(n)\right). \quad \text{Equation (2)}$$

The processor 102 may determine Equation (2) for each microphone signal i, and the processor 102 may select the signal associated with microphone j that has the largest energy $e_{i,dB}(k) = \text{argmax}_i e_{i,dB}(k)$ k) as the reference frame (reference element or certain item). Using the microphone signal $y_j$ with the largest energy, as a reference, cross-correlation may be performed to determine the delays $d_i$ relative to the closest microphone j to the audio source 206 (viz., showing the largest energy). This delay may be applied to the reference microphone signal $y_j(n)$ in relation to the other microphone signals and gain-weighted by $\beta_i$ to obtain the signal $z(n)$ for transmission. Specifically, the processor 102 may determine the signal $z(n)$ for transmission through the following equation:

$$z(n) = \sum_{i=1, i \neq j}^{N} (y_i(n) + \beta_i y_j(n + d_i)). \quad \text{Equation (3)}$$

The processor 102 may determine the cross-correlation function between frames of a particular length M, e.g., M=5296, of a microphone i signal and microphone j signal, for lag p, as:

$$r_{y_i, y_j}(p) = \frac{1}{2M-1} \sum_{n=-(M-1)}^{(M-1)} y_i(n) y_j(n+p). \quad \text{Equation (4)}$$

The processor 102 may determine an optimum lag p* that maximizes the cross-correlation sequence (viz., p*=argmax$_p$ r(p)) and if $r_{y_i,y_j}(p^*) \geq T$, then the processor may select the delay $d_i$ in the samples to be p*, in which T represents a certain threshold. If the audio source 206 is stationary and not moving, the optimum lag should be reasonably steady state except in cases where non-stationarity is introduced such as correlated noise between microphones.

The processor 102 may perform an optional operation to check for validity of the cross-correlation analysis, for instance, in the event that there is randomness in the arrival of frames 202a-202c at the apparatus 100. When there is randomness, there is a likelihood that the cross-correlation between frames 202a-202c may still be above threshold T even though the frames 202a-202c are not necessarily related by a simple linear-delay. In that case, the delay may be incorrectly estimated and accordingly an incorrect delay may be applied to the microphone signal with the largest signal level. In such a case, the quality of the combined audio signal would be degraded due to the introduction of artifacts either as perceptible audio echo/reverberation. The effect may or may not be disturbing and may depend on the number of distributed microphones. For instance, the higher the number of microphones, the lower the probability of perceptible artifacts as some delays may not be incorrectly estimated if the corresponding frames 202a-202c arrived synchronously.

Additionally, the level of the combined audio signal may change because less signal energy may be mixed in through the time-delay and gain-weighting, and appropriate strategies for adapting the algorithm to this condition may be implemented. For instance, dynamic range compression may be performed with appropriate attack and release time constants to match level smoothly against frames that arrived synchronously at the apparatus 100. Two strategies that may be used in identifying frame-jitter despite high correlation between frames may be premised on linear-prediction and cepstrum.

Audio signals, such as speech signals, may be represented as a source-filter model, in which the source may be considered to be a quasi-periodic signal (for voicing components), generally stationary in a short-time interval, or as a stationary noise sequence for fricatives. The filter may be represented as an all-pole model, and linear-predictive coding (LPC) model may be used for the filter representation to generate the synthesized speech. The all pole filter of order P, denoted by coefficients $\alpha_k$, for generating the speech signal $s(n)$ with input $u(n)$ may be given by, $$s(n) = -\sum_{k=1}^{P} a_k s(n-k) + Gu(n). \quad \text{Equation (5)}$$

In Equation (5), G is a gain term. In addition, the filter H(z) (where $z = e^{j\omega}$ on the unit circle may be defined as:

$$H(z) = \frac{G}{1 + \sum_{k=1}^{P} a_k z^{-k}}. \quad \text{Equation (6)}$$

Efficient techniques may be used on a frame-by-frame analysis to compute the pole-parameters using the Levinson-Durbin recursion for inverting the auto-correlation matrix including the speech-signal correlations. The computation of the autocorrelation may require PM operations (where M is the frame size). This may be reduced by performing perceptually-motivated frequency-warping (for example warping the speech signal to the Bark critical-band scale) before computing the pole-parameters, since the filter order in the warped domain to model H(z) is less than P for the same performance in a given frequency region of interest. Furthermore, with increasing order P increases the possibility of an ill-conditioned matrix including the speech signal auto-correlation matrix used for the Levinson-Durbin recursion.

By performing frequency-warping of the signal, prior to computing the all-pole parameters, the filter-order $\tilde{P} \ll P$ for an equivalent performance. For speech signals, the frequency region less than 5 kHz may be considered because the spectral features in this region help discriminate speech signals from each other (e.g., speech frames that bear high-correlation but are unrelated to each other). In essence, Bark warping is an approach for performing a non-uniform DFT (discrete Fourier Transform) around the unit-circle, with an emphasis on achieving higher-frequency resolution in the low-frequencies at the expense of higher-frequencies (viz., modeling the resolution of auditory filtering). After linear prediction on the warped speech spectra, the frequencies corresponding to the speech spectrum maximas may be compared between the two frames to determine structural similarities of the speech frame. If they are significantly similar (viz., there is a small mean-square error), the frames may be used for cross-correlation analysis, otherwise they may not be used for cross-correlation analysis. Specifically, the processor 102 may determine an inter-frame-jitter-prediction-error (IFJPE) between frame k and l, defined as a ratio of spectra, as follows:

$$IFJPE(k, l) = 20 \log_{10}\left(\frac{1}{2\pi}\int_{-\pi}^{\pi}\frac{|H(\omega, k)|}{|H(\omega, l)|}d\omega\right). \quad \text{Equation (7)}$$

The processor 102 may use Equation (7) to ensure that the frames are structurally similar in the frequency-location of the pole-peaks of the warped linear prediction model. The processor 102 may carry out the integration with the trapezoidal integration rule and the processor 102 may use the normalization constant of I (DFT length) instead of $2\pi$. H(w,k) is the Fourier Transform of a time domain signal h(n) in frame k, in which h(n) may be equivalent to the microphone signal x(n).

Mel-frequency cepstral coefficients (MFCC) may be used in speech applications as part of the feature set for recognizing speech. For instance, the speech frame of 5296 samples (appropriately windowed) may be Hamming windowed into overlapping segments of 25 ms (1200 samples), the Discrete Fourier Transform (DFT) and then the spectrum may be derived for each of the overlapping frames. The magnitude spectrum for each overlapping frame may be filtered by a filterbank of R triangular overlapping windows (viz., mel filterbank) with sum-energy normalized to unity. The mel filters are overlapping triangular filters that approximate the filtering along the basilar membrane of the cochlea and employ narrow bandwidth filters in the lower frequency. The critical-band or Bark and ERB filters are other auditory filter models. The filterbank output may be converted to the log-domain and applied to a discrete cosine transform (DCT-II) to obtain the MFCC(m).

The zeroth MFCC (viz., MFCC(0)) is the energy of the speech frame and may be used for normalization and/or discarded from the analysis. The processor 102 may use the following signal-processing operations, $$Y_r(\omega) = \frac{1}{A(\omega)}M_r(\omega)X(\omega) \quad \text{Equation (8)}$$

$$A(\omega) = \sum_{r=1}^{R}|M(\omega)|^2 = 1 \quad \text{Equation (9)}$$

$$MFCC(m) = \sum_{r=1}^{R}\log|Y_r(\omega)|\cos\left(\frac{2\pi}{R}\left(r+\frac{1}{2}\right)m\right) \quad \text{Equation (10)}$$

$$(M = 0, 1, \ldots, S)$$

In Equations (8)-(10), X(w) is the Fourier Transform of microphone signal x(n), $M_r(w)$ is the frequency response of the r-th filterbank. $M_r(n)$ is the time-response associated with that filterbank and the filterbank may be ERB, Bark of DCT, etc. The frame number, k, notation has been dropped for simplicity.

Some or all of the operations set forth in the method 300 may be contained as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium. Additionally, appropriate noise suppression strategies as well as blind de-reverberation may be applied to enhance the signal to noise and reverberation ratio, before cross-correlation. This may yield better estimates to the delays.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Test Case

Figure 4A:
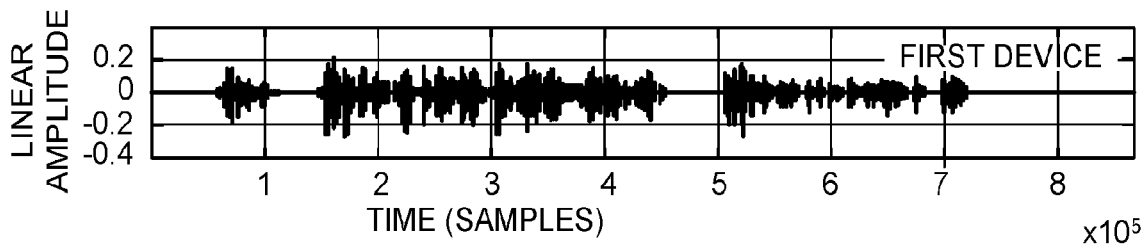
FIGS. 4A-4C, respectively, show signals acquired by three devices in a test case.
Figure 4B:
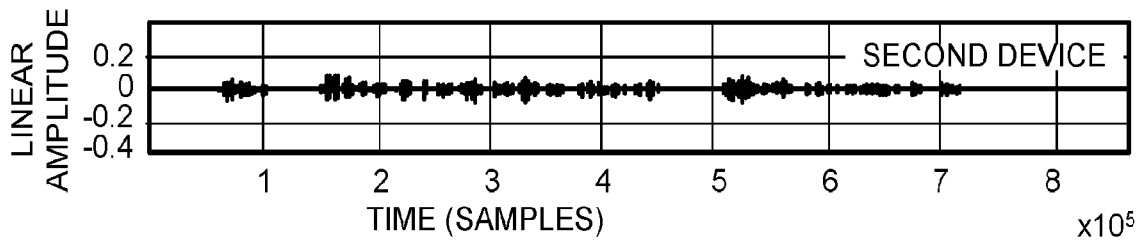
Figure 4C:
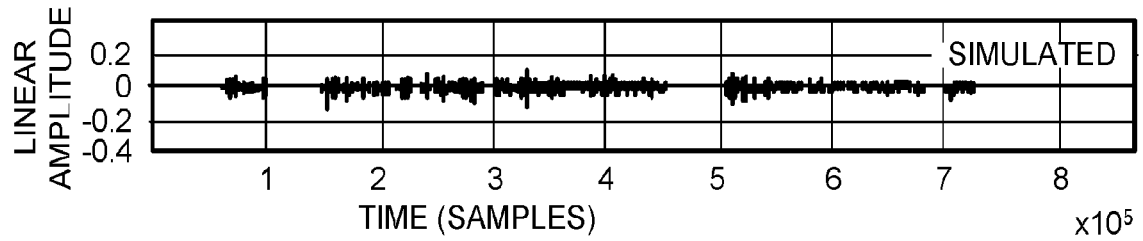

In an experiment, speech signals were obtained in a medium-sized conference room from a first device's microphone and a second device's microphone, and additionally a third speech signal was generated using a simulated delay and level-attenuation (to account for off-axis response from a microphone and distance based attenuation). The separation between the first device and the second device was a little over 1 meter across the conference room, and speech was captured close to the first device (the energies computed in an example frame below shows that this first device is correctly identified as a reference). FIGS. 4A-4C respectively show the signals acquired by the first device, the second device, and the simulated acquisition. The simulated acquisition was computed by using −5 dB attenuation on the first device signal and a high-frequency loss due to an off-axis microphone response to account for any diffraction/shadowing effects, whereas the delay was 250 samples.

Figure 5:
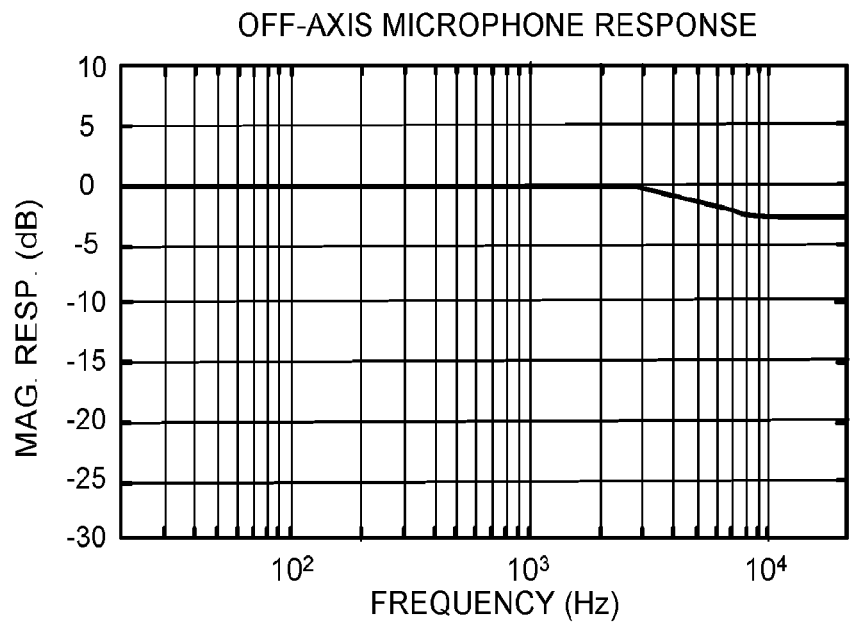
FIG. 5 shows the off-axis microphone response used in the test case.

FIG. 5 shows the off-axis microphone response used in the test case. The differences in latencies due to differences in data acquisition hardware on separate laptops have been manually pre-compensated. These latencies may be known a priori for devices and automatically corrected. Furthermore, any constant microphone pre-amp gain introduced either by user settings or recording hardware may be used in proper gain-normalization of the microphone-captured signals.

Figure 6A:
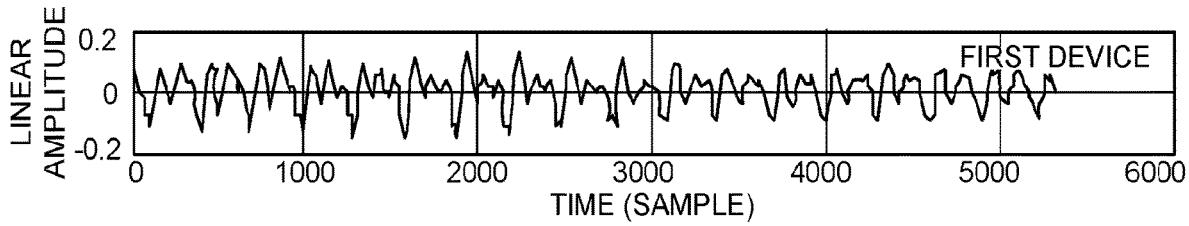
FIGS. 6A-6C, respectively, show frame-analyzed signal amplitude for the three devices in the test case.
Figure 6B:
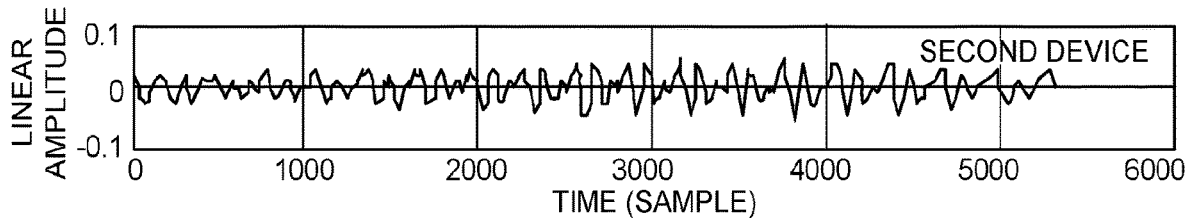
Figure 6C:
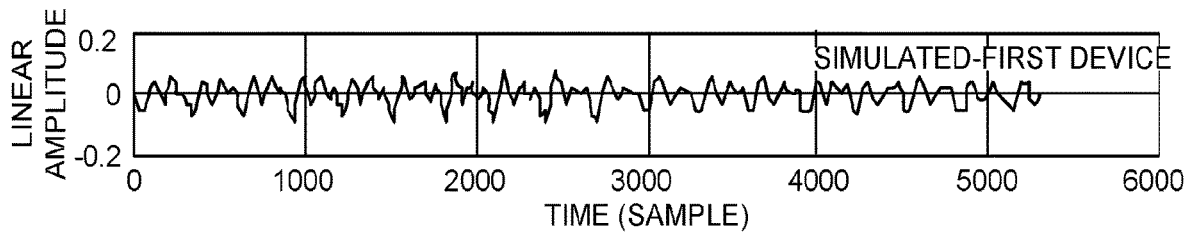

Assuming the presence of a voice-activity-detector (VAD) and any noise-suppression processing, the frame-analyzed signal energy from the first device microphone is larger than the second device. For example, for speech frame 38 (shown in FIGS. 6A-6C) of duration 5296 samples (starting from 201248 sample number), the energies are, $$e_{zbook,dB}(38) = -25.24$$

$$e_{macbook,dB}(38) = -34.78$$

$$e_{zbooksim,dB}(38) = -30.15 \quad \text{Equation (11):}$$

Figure 7A:
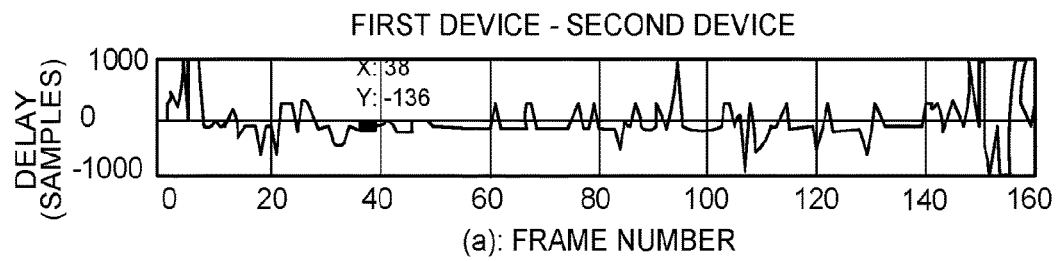
FIGS. 7A and 7B, respectively, show a computed delay in samples analyzed over the frames of devices in the test case and a corresponding maximum value of the cross-correlation in the corresponding frames.
Figure 7B:
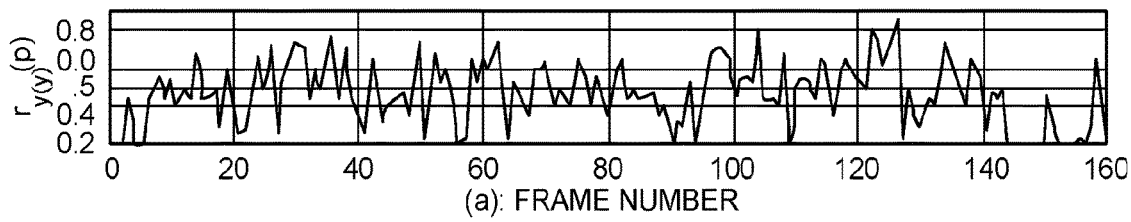
Figure 8:
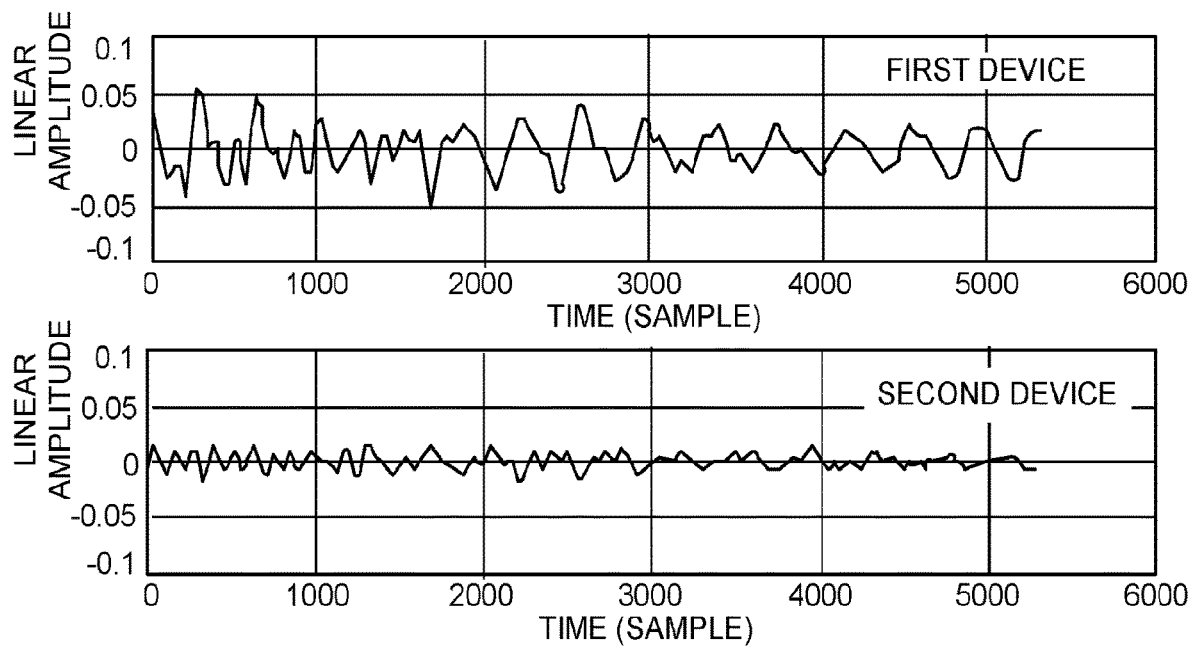
FIG. 8 shows the signals in a frame in the test case.

The cross-correlation analysis from prior section yields information in FIGS. 7A-9. Specifically, FIG. 7A shows the computed delay in samples analyzed over the frames of second device relative to the first device, whereas FIG. 7B is the corresponding maximum value of the cross-correlation in that frame. If this value is larger than T (T=0:5 was used in the present condition) then the delay associated with this maxima is used in Equation (3). Negative delays indicate that the first device microphone j is leading relative to the second device microphone i=1 and hence would need to be delayed by $d_j$. For example, for frame 38, $d_j$=−138 samples (corresponding to r(p*)=0:69) and this delay is applied in Equation (3) to coherently sum with the signal from the second device. Note, this delay of 138 samples corresponds to a distance of 1 m of the second device from the first device (the true distance between the two devices in the room was just about 1 m as well). Rarely, there may be confounding information as determined from cross-correlation. For example, frame 61 yields r(p)=0:59 with $d_j$=+241 samples and clearly this is not possible since the talker is stationary (signal energies for the first device and the second device are −34.96 dB and −45 dB respectively). FIG. 8 shows the signals in frame 61, and under this condition the threshold can either be adaptively changed, or the delay may be fixed to the value that was determined to be negative in prior frame. Additionally, there may be a delay-offset, $\delta d_j$, computed between frames. This will not be detrimental if the offset is within ten or so milliseconds (less than about 800 samples) as this is within the perceptual limit within which an echo-like speech will not be audibly perceived. As can be seen from FIGS. 7A-7C, and an analysis performed off-line, the offset has been observed to be well within this perceptual limit.

Figure 9A:
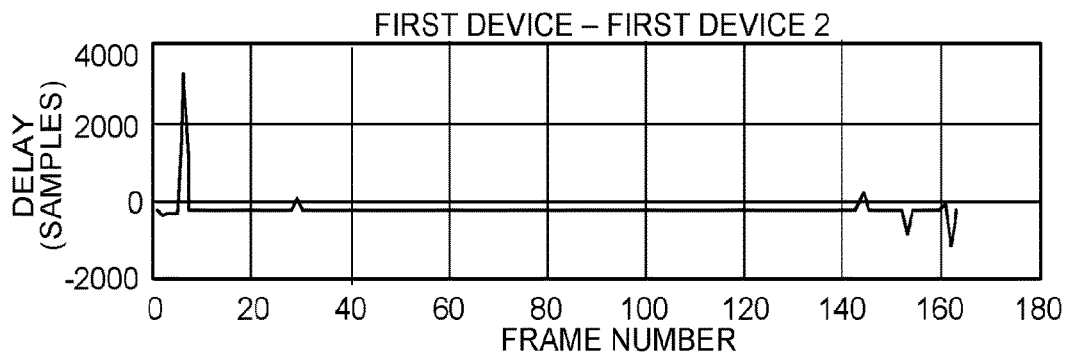
FIGS. 9A and 9B, respectively, show the analysis between devices in the test case.
Figure 9B:
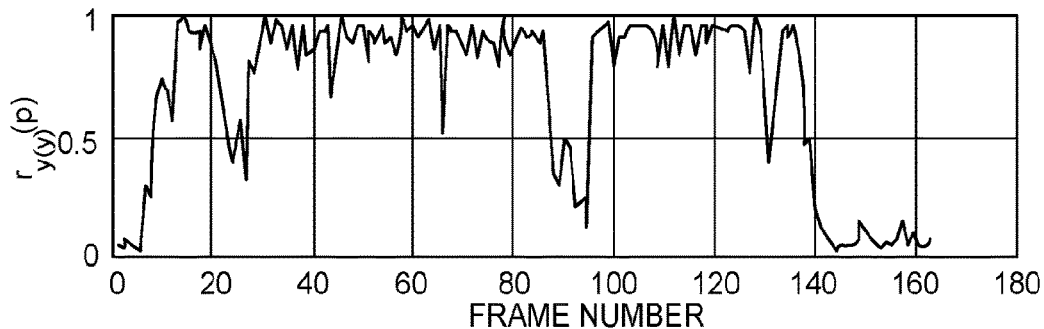

FIGS. 9A and 9B, respectively, show the analysis between the first device microphone j and the simulated acquisition microphone i=2. The results indicate correctly that the delay $d^i=2$ estimated for valid $r(p^*)$ is −250 samples.

Figure 10:
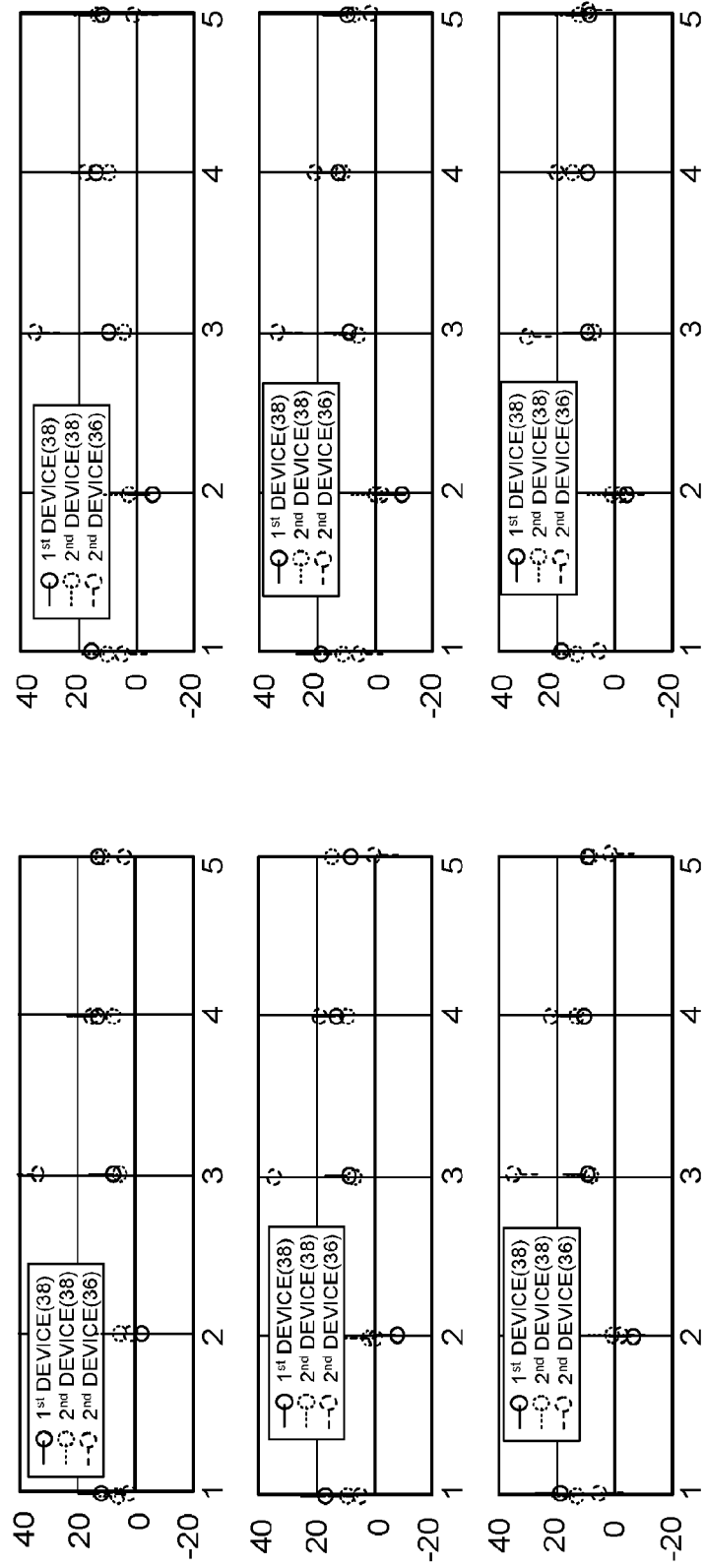
FIG. 10 shows the first five Mel-frequency cepstral coefficients for device speech frames in the test case.

FIG. 10 shows the first five Mel-frequency cepstral coefficients MFCCs(m) {m=1; 2; : : : ; 5} (with the zeroth MFCC having been discarded) computed with a 25 ms window and a hop of 10 ms for the first device and the second device speech frames 38, and the second device speech frame 36 (emulating jitter). A largest discrimination is indicated on both frames (first device (38) and second device (36)) on MFCC(3). Accordingly, either of two metrics (based on maxima or mean-square-error) may be used to determine the existence of jitter based on a threshold by comparing two microphone signal frames (viz., between microphones j and i), for each window τ of 25 ms length:

$$m^* = \mathrm{argmax}_m \left( MFCC_{i,\tau}(m)|_{i \neq j} \right) \quad \text{Equation (12)}$$

$$\Delta_{MFCC_{i,j}}(\tau) = (MFCC_{i,\tau}(m^*) - MFCC_{j,\tau}(m^*))$$

$$\Delta_{MFCC_{i,j}} = \frac{1}{\tau_2 - \tau_1 + 1} \sum_{\tau=\tau_1}^{\tau_2} \Delta_{MFCC_{i,j}}(\tau)$$

In the present example, $\Delta_{MFCC_{i,j}}=25.4$ between the reference first device frame 38 and jitter frame 36 from second device. For illustrative purposes, if there was no jitter (second device frame 38 being delivered in synchronous with frame 38 of first device), then $\_\Delta_{MFCC_{i,j}}=1.6$. Using this approach thus helps discriminate between correlated and structurally same frames against correlated and structurally dissimilar frames, from different microphones, in a distributed array.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    a processor;
    a memory on which is stored machine readable instructions that are to cause the processor to:
        determine a reference frame from a plurality of frames received at multiple different times, wherein each of the plurality of frames includes audio signal data, and wherein the reference frame includes audio signal data that identifies a highest audio signal level among audio signals identified in the plurality of frames;
        time-align the reference frame with each of the plurality of frames other than the reference frame to obtain respective time-aligned frames;
        add the audio signals identified in each of the respective time-aligned frames together to generate respective added audio signals;
        combine the respective added audio signals together to obtain a combined audio signal; and
        output the combined audio signal.

2. The apparatus according to claim 1, wherein the instructions are further to cause the processor to:
    receive the plurality of frames from a distributed set of devices at a plurality of different times with respect to each other.

3. The apparatus according to claim 2, wherein the instructions are further to cause the processor to:
    determine respective differences in the times at which the reference frame and the other frames in the plurality of frames were received; and
    use the determined respective differences in the times to time-align the reference frame with each of the plurality of frames other than the reference frame and obtain the respective time-aligned frames.

4. The apparatus according to claim 3, wherein to determine the respective differences in the times, the instructions are further to cause the processor to:
    cross-correlate the reference frame with each of the other frames in the plurality of frames.

5. The apparatus according to claim 4, wherein the instructions are further to cause the processor to:
    identify the plurality of frames to be cross-correlated through implementation of a jitter identification technique on the audio signal data corresponding to the plurality of frames.

6. The apparatus according to claim 5, wherein implementation of the jitter identification technique comprises at least one of implementation of a linear predication technique and Mel-frequency cepstral coefficients.

7. The apparatus according to claim 2, wherein the devices in the distributed set of devices comprise at least one of a laptop computer, a smart phone, a tablet computer, and a standalone microphone.

8. The apparatus according to claim 1, wherein to add the audio signals in each of the respective time-aligned frames together, the instructions are further to cause the processor to:
    individually align the audio signal in the reference frame to the audio signals in each of the plurality of frames other than the reference frame to obtain a set of aligned audio signals; and
    wherein the instructions are further to cause the processor to combine the set of aligned audio signals to obtain the combined audio signal.

9. A method comprising:
    receiving audio signal elements at multiple times from distributed devices, wherein the audio signal elements include respective audio signals collected by the distributed devices;
    determining a reference element among the received audio signal elements, the reference element corresponding to the audio signal having a highest level among the respective audio signals;

determining respective differences in the times at which the reference element and the audio signal elements other than the reference element were received;

time-aligning, based upon the determined respective differences, the reference element with each of the audio signal elements other than the reference element to obtain respective time-aligned audio signal elements;

adding the audio signals corresponding to the respective time-aligned audio signal elements to obtain respective added audio signals; and combining the respective added audio signals together to obtain a combined audio signal.

10. The method according to claim 9, wherein the audio signals comprise speech and wherein the method further comprises:

outputting the combined audio signal through an Internet based voice communication service.

11. The method according to claim 9, wherein adding the audio signals corresponding to the respective time-aligned audio-signal elements further comprises:

individually aligning the audio signal in the reference frame to the audio signals in each of the plurality of audio signal elements other than the reference element to obtain a set of aligned audio signals; and combining the set of aligned audio signals to obtain the combined audio signal.

12. The method according to claim 9, further comprising:

identifying the audio signal elements to be time-aligned with the reference element through implementation of a jitter identification technique on the audio signals included in the audio signal elements.

13. A non-transitory computer readable medium on which is store machine readable instructions that when executed by a processor, cause the processor to:

receive audio signal items at multiple times from a plurality of devices, wherein each of the audio signal items includes a respective audio signal collected by a device of the plurality of devices;

determine a certain item among the received audio signal items, the certain item corresponding to the audio signal having a highest level among the respective audio signals;

time-align the certain item with each of the audio signal items other than the certain item to obtain respective time-aligned audio signal items;

add the audio signals corresponding to the respective time-aligned audio signal items to obtain respective added audio signals; and combine the respective added audio signals together to obtain a combined audio signal.

14. The non-transitory computer readable medium according to claim 13, wherein the instructions are further to cause the processor to:

determine respective differences in the times at which the certain item was received and the times at which the audio signal items other than the certain item were received; and use the determined respective differences in the times to time-align the certain item with each of the audio signal items other than the certain item to obtain the respective time-aligned audio signal items.

15. The non-transitory computer readable medium according to claim 13, wherein the instructions are further to cause the processor to:

identify the audio signal items to be time-aligned with the certain item through implementation of a jitter identification technique on the audio signals included in the audio signal items.

* * * * *